United States Patent Office 2,719,785
Patented Oct. 4, 1955

2,719,785

HERBICIDAL COMPOSITIONS

Gordon B. Johnson, Berkeley, Calif., assignor to California Research Corporation, San Francisco, Calif., a corporation of Delaware No Drawing. Application June 2, 1952,
Serial No. 291,293

16 Claims. (Cl. 71—2.6)

This invention is directed to the preparation of herbicidal compositions. More particularly, it relates to the preparation of a herbicidal concentrate in the form of a stable oil-in-water emulsion prepared by emulsifying in water a solution of an effective weed-killing toxicant in a petroleum hydrocarbon oil with the aid of an effective emulsifying agent normally insoluble or only partially soluble in oil, rendered oil-soluble by blending with an aliphatic alcohol.

The effectiveness of herbicidal compositions which contain pentachlorophenol, or 2,4-dichlorophenoxyacetic acid, or their salt and ester derivatives, in killing the weeds is well known. In the application of these compositions for controlling and suppressing the growth of weeds the applicator naturally aims at minimizing the costs of his materials. Solutions of pentachlorophenol and 2,4-dichlorophenoxyacetic acid and their salt and ester derivatives in aromatic petroleum hydrocarbon oils such as Diesel oils are known to be potent weed killers, but their costs are relatively high as compared with emulsions of the oils containing the toxicant in water. Many of these oil-soluble materials toxic to weeds are insoluble or only moderately soluble in water and, as a consequence, must be first dissolved in a suitable oil before the resulting oil solution is converted into an oil-in-water emulsion by employing a suitable emulsifier.

A number of surface-active agents have been proposed as emulsifiers for the preparation of oil-in-water type weed-killing emulsions, the choice of an emulsifier being in each case determined by its ability to disperse in water a desired concentration of the toxicant dissolved in oil so as to furnish an emulsion suitable for the purposes of spraying. Many of these emulsifiers are, however, oil-insoluble, and it is not possible to mix them with the oil and the oil-soluble toxicant prior to the preparation of the oil-in-water emulsion. When desiring to employ such an oil-insoluble emulsifier, one must first prepare two separate solutions, one containing the oil and toxicant and the other containing water and emulsifier before the oil can be emulsified in the water. On the other hand, with an oil-soluble emulsifier, one would need to prepare but one solution—a mixture of the oil, toxicant and emulsifier—prior to the preparation of the oil-in-water emulsion. Thus, the employment of an oil-soluble emulsifier would simplify packaging problems, shorten the preparation time and reduce the costs as compared with the employment of oil-insoluble emulsifiers. Very effective emulsifiers for the preparation of oil-in-water type weed-killing emulsions are provided by the anionic surface-active compounds from the group consisting of sodium $C_9$–$C_{18}$ monoalkyl benzene sulfonates and sodium $C_9$–$C_{18}$ monoalkyl sulfates in a substantially pure state, free from inorganic salt contaminants. These alkyl benzene sulfonates and alkyl sulfates free from inorganic salts are sufficiently soluble in oil to make possible the preparation of an oil-toxicant-emulsifier solution prior to the emulsification of the oil in water. In particular, the anionic sodium $C_{12}$–$C_{15}$ monoalkyl benzene sulfonates free from inorganic salt admixture are found to be excellent emulsifiers for the toxicant-carrying oils.

Production of substantially 100% pure sodium $C_9$–$C_{18}$ monoalkyl benzene sulfonates or sodium $C_9$–$C_{18}$ alkyl sulfates is not, however, a simple matter, and, if more than about 2% of inorganic salt contaminants are present, mixed with the monoalkyl benzene sulfonate or alkyl sulfate, the sulfonate or the sulfate has only limited oil solubility. The small portion of the alkyl benzene sulfonate-inorganic salt or alkyl sulfate-inorganic salt mixture, which will dissolve in the petroleum hydrocarbon oils employed as carriers or solvents for weed-killing toxicants, is not sufficient to emulsify the toxicant-bearing oil in water. The less expensive sodium salts of $C_9$–$C_{18}$ alkyl benzene sulfonic acids and $C_9$–$C_{18}$ alkyl sulfates all contain varying amounts of inorganic sodium sulfate intimately admixed therewith and, while being inexpensive and eminently suitable as detergents and wetting agents for a number of industrial and household applications, cannot be used as oil-soluble emulsifiers for oil-in-water emulsions.

I have found that blends of certain commercially available anionic surface-active agents with $C_4$-saturated aliphatic alcohols can be employed as emulsifiers for the preparation of stable oil-in-water emulsions suitable as herbicidal concentrates for the control and eradication of weeds. The particular anionic surface-active agents suitable for the preparation of these blends are sodium $C_9$–$C_{18}$ monoalkyl benzene sulfonates and sodium $C_9$–$C_{18}$ alkyl sulfates. By formulating the blends in such a way that each 100 parts by weight thereof contains from about 75 to about 60 parts of the effective commercial anionic surface-active agent, the remainder being a $C_4$-saturated aliphatic alcohol, the organic sulfonate or organic sulfate surface-active agent is rendered oil-dispersible, despite the presence therein from about 2 to about 15% by weight of sodium sulfate, based on the combined weight of non-aqueous anionic and inert components of the surface-active agent. In other words, when blending the commercial surface-active anionic organic sulfonates and sulfates with the $C_4$-saturated aliphatic alcohol in accordance with my invention, the weight ratio of the organic sulfonate or organic sulfate to the inorganic sulfate in the surface-active product can range from about 98:2 to about 85:15. The operative proportions of the $C_4$-aliphatic alcohol ranging from about 25 to about 40 parts by weight in each 100 parts of the blend on non-aqueous basis, may vary somewhat depending on the atmospheric conditions of temperature and pressure. When the inorganic sulfate content in the surface-active organic sulfonate or sulfate product suitable for blending with the $C_4$-aliphatic alcohol is comparatively high, i. e., when it approaches the upper 10 to 15% limit of the aforementioned range from 2 to 15% by weight, more alcohol may be required to provide the desired dispersibility or solubility in oil and to eliminate substantially the separation or sedimentation of sodium sulfate crystals. Therefore, whenever the organic sulfonate or sulfate contains from about 10 to about 15% by weight of sodium sulfate, from 35 to 40 parts by weight of the $C_4$-aliphatic saturated alcohol should be preferably employed to make up 100 parts of the blend in order to secure satisfactory oil solubility.

Preferably, the surface-active sulfonate or sulfate product is added to the $C_4$-aliphatic alcohol in the form of an aqueous slurry or paste containing up to 50% by weight of water. While the desired emulsifier can be prepared with any $C_4$-aliphatic alcohol, the emulsifier prepared with secondary butanol is preferred, because it is more stable with changing atmospheric conditions.

My new emulsifier blends of $C_4$-aliphatic alcohol and sodium alkyl benzene sulfonate-sodium sulfate product or sodium alkyl sulfate-sodium sulfate product dissolve in water, forming mobile, homogeneous liquids. On standing, and depending upon atmospheric conditions, this liquid may separate into two phases, but both phases are fluid and can be readily re-mixed to produce the original mixture.

The new emulsifier combination of my invention is added to the oil containing the toxicant in a concentration effective to kill weeds preferably of the order of about 1 pound per 1 gallon of oil (or about 1 part by weight of the toxicant to about 7.5 parts by weight of the oil) in an amount which may range from about 1.5 to about 10% by weight based on the total weight of the final oil solution. This oil solution is then subjected to emulsification by any appropriate technique, as, for instance, in an homogenizer or in a colloidal mill. I have found that with my new emulsifier, it is possible to form oil-in-water emulsion in which the disperse oil phase takes up from 60 to 70% by weight thereof. These emulsions are stable for at least 90 days and are not broken upon dilution with water.

For actual applications in agriculture, the herbicide concentrates in the form of oil-in-water emulsions prepared in accordance with my invention may be readily diluted with water to satisfy the particular requirement of each problem of weed control and weed eradication, and the dilutions may contain as little as 1% by weight and even less of the oil (meaning the oil containing the toxicant and the C4-aliphatic alcohol-sulfonate emulsifier). These dilutions can be used successfully for herbicidal contact sprays.

The solubilizing effect of the addition of a C4-aliphatic saturated alcohol to sodium alkyl benzene sulfonates or sodium alkyl sulfates containing from 2 to 15% by weight of sodium sulfate based on non-aqueous surface-active and inert ingredients of the organic sulfonate or sulfate product, which enables the maker or the applicator of the weed-killing preparations to secure stable oil-in-water emulsions containing active 2,4-dichlorophenoxyacetic acid, pentachlorophenol or their salt and ester derivatives is entirely unexpected because other likely solubilizers such as ethanol, isopropanol amyl alcohol and butyl cellosolve are found to be ineffective, and their employment under similar conditions causes salt separation. While any of the saturated C4-aliphatic alcohols can be used to prepare the emulsifier, I found that the emulsifier formed with secondary butanol is the most effective one.

The following illustrative examples of the preparation of the emulsifier of my invention and of the oil-in-water emulsion concentrates containing effective weed-killing toxicants, as well as the examples of tests with other aliphatic alcohols, which showed that these alcohols are ineffective as solubilizers for sodium sulfate-containing organic sulfonate, are given hereinafter to provide a better understanding of the principles and operation of the invention.

*Example 1*

An emulsifier composition was prepared by employing an aqueous slurry or paste consisting of about 50–55% of an anionic surface-active sulfonate and blending it with secondary butanol. This sulfonate slurry or paste was produced by sulfonating a stock of monoalkyl benzenes containing from 9–18 carbon atoms in the alkyl chain with the aid of from 2.5 to 3.5 mols of fuming sulfuric acid. The resulting mixture of $C_9$–$C_{18}$ monoalkyl benzene sulfonic and unreacted sulfuric acid was allowed to settle, and most of the sulfuric acid was withdrawn by decantation, so that the remaining acid mixture contained from 85–88% by weight of the sulfonic acid and 15–12% by weight of unreacted sulfuric acid. This mixture was then neutralized with sodium hydroxide. The neutralized paste-like product contained approximately 50–55% of sodium alkylbenzene sulfonate having an average molecular weight of about 350 and from 4–7% of inorganic sodium sulfate and unsulfonated oil, the remainder being water. 80 parts by weight of this paste was blended with 20 parts by weight of secondary butanol, and the resulting homogeneous blend or slurry was found to be dispersible in an aromatic petroleum hydrocarbon oil boiling in the range from about 300 to about 750° F. It was employed to emulsify an aromatic petroleum hydrocarbon oil solution containing pentachlorophenol in a concentration of about 1 pound of pentachlorophenol to 1 gallon of the oil. The emulsification was carried out in a hand homogenizer and the final emulsion was found to contain 36% of water and 64% of oil. 0.13 pound of the emulsifier comprising sulfonate and secondary butanol was required to emulsify 1 gallon of the oil. This oil-in-water emulsion was found to remain stable after 30 days.

*Example 2*

In this case the blend is effected by following substantially the same technique as the one shown in Example 1, but this time an aqueous slurry of about 50% of sodium $C_9$–$C_{18}$ monoalkyl sulfate is combined with secondary butanol (80 parts by weight of alkyl sulfate to 20 parts by weight of secondary butanol). The final weed-killing emulsion, similarly to that of Example 1, remains stable upon storage and can be readily diluted with water.

*Example 3*

In this example, normal butanol was substituted, for the secondary butanol of Example 1, in the preparation of an emulsifier in accordance with the procedure outlined in said example. A homogeneous paste was formed and was found to have emulsifying properties similar to those obtained with the secondary butanol.

*Example 4*

This time, tertiary butanol was employed for the preparation of the emulsifier, following the same procedure as described in Example 1. The resulting product was found to be liquid at room temperature and possessed emulsifying properties which resembled those obtained with the secondary butanol in Example 1.

*Example 5*

In this example, I employed ethanol in lieu of a C4-aliphatic alcohol of the preceding examples, while following the blending technique of Example 1. After having mixed together the ethanol and the sodium alkyl benzene sulfonate slurry, sodium sulfate crystals did, however, separate from the mixture.

*Example 6*

When isopropanol was substituted for a C4-aliphatic alcohol, such as were tested in Examples 1, 2 and 3, using the same procedure for the preparation of the emulsifier composition, the results were disappointing, and salt separation took place.

*Example 7*

In this case, amyl alcohol was employed in lieu of a C4-aliphatic alcohol, while following the procedure outlined in Example 1. A very viscous paste was formed. Upon standing, crystals of sodium sulfate appeared in this paste and gradually settled to the bottom of the container.

*Example 8*

Butyl Cellosolve was employed in lieu of a C4-aliphatic alcohol for the preparation of an emulsifier composition of my invention by adhering to the same conditions as employed in Example 1. The results were unsatisfactory, and sodium sulfate crystals were noted to separate.

*Example 9*

An emulsifier composition was prepared by employing a sodium sulfonate wetting agent derived from the sulfuric acid treatment of certain petroleum fractions and known in the art under the name of mahogany sulfonate. This sulfonate is oil soluble and is conventionally used in the preparation of weed-killing oil-in-water emulsions. It was observed that in order to obtain an emulsion of the same stability and concentration as was obtained in Example 1, as much as 0.3 pound of this emulsifier per 1 gallon of the toxicant-bearing oil was required, an amount which is more than twice the amount of the sulfonate-secondary butanol blend of Example 1. Furthermore, it was found that blending secondary butanol with this mahogany sulfonate did not change emulsification characteristics of this latter.

*Example 10*

In this example an emulsifier composition of the same kind as in Example 1 was prepared by blending together 20 parts of secondary butanol with 80 parts of an 85/15 aqueous (50% by weight of water) slurry of sodium $C_{12}$-$C_{15}$ monoalkylbenzene sulfonate and sodium sulfate. The blend was meta-stable and on standing separated into two phases. However, separation of sodium sulfate crystals was not observed, and the two phases could be readily remixed. To ascertain the effect of increasing the amount of secondary butanol, 30 parts by weight thereof was blended with the sulfonate. In this case, sodium sulfate crystals did separate. On the other hand, when less than 11 parts by weight of secondary butanol was blended with the sulfonate product, solubility of the final blend in the oil containing weed-killing toxicant (pentachlorophenol) diminished.

*Example 11*

In this example an emulsifier blend containing 20% by weight of secondary butanol and 80% by weight of the aqueous sulfonate product of Example 1 was used to emulsify an aromatic petroleum hydrocarbon oil boiling between about 440 and 700° F. and containing in each gallon thereof about 1 pound of triethylamine salt of 2,4-dichlorophenoxyacetic acid as the active toxicant ingredient. The emulsification was effected in a colloid mill, and the final emulsion concentrate was observed to contain 33% of water and 67% of the oil. It was found that upon further decrease of the quantity of water for the emulsification, a water-in-oil emulsion resulted instead of an oil-in-water emulsion.

From the foregoing description it will be noted that the $C_4$-saturated aliphatic alcohols exhibit an unsual and unexpected ability to solubilize the inorganic sulfate component in surface-active compositions containing sodium $C_9$-$C_{18}$ monoalkylbenzene sulfonates or sodium $C_9$-$C_{18}$ monoalkyl sulfates in an intimate mixture with from about 2 to about 15% of sodium sulfate, based on the combined weight of the surface-active organic and inert inorganic components of such a mixture. Notwithstanding the presence of from about 2 to about 15% by weight of inorganic sulfate in the aforementioned surface-active compositions, the application of $C_4$-saturated aliphatic alcohols in accordance with my invention permits of dissolving these compositions in either petroleum hydrocarbon oils or in aqueous solutions of non-ionic detergents, e. g., in solutions of $C_8$-$C_{15}$ alkyl phenyl polyglycol ethers containing from 6 to 16 ethylene glycol units in the polyglycol portion of the ether molecule.

It is known that the presence of inorganic sulfate in the anionic component of the so-called "liquid detergents" containing in solution combinations of non-ionic and anionic compositions results in the precipitation of inorganic sulfate crystals and/or cloud formation in the aqueous, aqueous-alcoholic, or alcoholic solutions of these combinations.

Therefore, time-consuming desalting techniques must be applied to organic sulfonates and sulfate compositions employed as anionic components in these liquid detergent formulations, adding substantially to the manufacturing cost thereof. My discovery of the unique solubilizing action of the $C_4$-saturated aliphatic alcohols dispenses with the necessity of a desalting treatment and markedly reduces the cost of formulating the liquid detergents containing the aforementioned combinations of organic anionic and non-ionic compositions.

The oil-in-water emulsions containing effective concentrations of weed-killing derivatives of pentachlorophenol and 2,4-dichlorophenoxy-acetic acid and prepared with the aid of the emulsifier combination of my invention are capable of being further diluted with water to contain as little as 1% of the oil. In this diluted form they can be employed in contact herbicidal sprays for a great variety of weed-control treatments and are eminently effective in controlling the growth of broad-leaf weeds. This latter type of weeds presents a particularly serious problem in the sugar cane and pineapple plantations of the tropical regions, e. g., in Cuba, Hawaii, Puerto Rico, where weeds emerge before the useful crop and are thus apt to smother the new plants. Considering the extent of these planting areas where weed-killing formulations must be applied to preserve the useful crop plant growth, the employment of my inexpensive, commercially readily available emulsifier certainly effects a substantial improvement and a sizeable saving for the grower: It permits him to substitute water for a large portion of the aromatic petroleum hydrocarbon oil required as a carirer for the weed-killing toxicants, and the preparation of weed-killing oil-in-water emulsions by effecting the emulsification in water of one single solution containing together, the oil carrier, the toxicant and the emulsifier.

It is to be understood that the above description and examples are intended to be illustrative only, and that any modification or variation therefrom in conformity with the spirit of the invention is intended to be included within the scope of the following claims.

I claim:
1. An emulsifier, each 100 parts by weight whereof on non-aqueous basis comprises about 25 to about 40 parts by weight of a $C_4$-aliphatic alcohol and from about 75 to about 60 parts by weight of an anionic surface-active agent selected from the group consisting of sodium $C_9$-$C_{18}$ monoalkyl benzene sulfonates and sodium $C_9$-$C_{18}$ monoalkyl sulfates and containing intimately admixed therewith from about 2 to about 15% by weight of sodium sulfate, based on the combined weight of non-aqueous ingredients of said surface-active agent, said emulsifier being capable of emulsifying in water an aromatic petroleum hydrocarbon oil boiling between about 300 and about 750° F. and containing in solution a weed-killing toxicant from the group consisting of pentachlorophenol, 2,4-dichlorophenoxyacetic acid and their salt and ester derivatives.

2. An emulsifier, each 100 parts by weight whereof on non-aqueous basis comprises from about 25 to about 40 parts by weight of a $C_4$-aliphatic alcohol and from about 75 to about 60 parts by weight of sodium $C_9$-$C_{18}$ monoalkylbenzene sulfonate containing intimately admixed therewith from about 2 to about 15% by weight of sodium sulfate, based on the combined weight of said sulfonate and sulfate on non-aqueous basis, said emulsifier being capable of emulsifying in water an aromatic petroleum hydrocarbon oil boiling between about 300 and about 750° F. and containing in solution a weed-killing toxicant from the group consisting of pentachlorophenol, 2,4-dichlorophenoxyacetic acid and their salt and ester derivatives.

3. An emulsified, each 100 parts by weight whereof on non-aqueous basis comprises from about 25 to about 40 parts by weight of a $C_4$-aliphatic alcohol and from about 75 to about 60 parts by weight of sodium $C_9$-$C_{18}$ monoalkyl sulfate containing intimately admixed therewith from about 2 to about 15% by weight of sodium sulfate, based on the combined weight of said organic sulfate and inorganic sulfate on non-aqueous basis, said emulsifier being capable of emulsifying in water an aromatic petroleum hydrocarbon oil boiling between about 300 and about 750° F. and containing in solution a weed-killing toxicant from the group consisting of pentachlorophenol, 2,4-dichlorophenoxyacetic acid and their salt and ester derivatives.

4. An aqueous emulsifier, each 100 parts by weight whereof on non-aqueous basis comprises about 25 to about 40 parts by weight of a $C_4$-aliphatic alcohol and from about 75 to about 60 parts by weight of an anionic surface-active agent selected from the group consisting of sodium $C_8$–$C_{18}$ monoalkyl benzene sulfonates and sodium $C_9$–$C_{18}$ monoalkyl sulfates and containing intimately admixed therewith from about 2 to about 15% by weight of sodium sulfate, based on the combined weight of non-aqueous ingredients of said surface-active agent, said emulsifier being capable of emulsifying in water an aromatic petroleum hydrocarbon oil boiling between about 300 and about 750° F. and containing in solution a weed-killing toxicant from the group consisting of pentachlorophenol, 2,4-dichlorophenoxyacetic acid and their salt and ester derivatives.

5. An emulsifier, each 100 parts by weight whereof on non-aqueous basis comprises from about 25 to about 40 parts by weight of a $C_4$–aliphatic alcohol and from about 75 to 60 parts by weight of sodium $C_{12}$–$C_{15}$ monoalkyl benzene sulfonate containing intimately admixed therewith from about 2 to about 15% by weight of sodium sulfate, based on the combined weight of said sulfonate and sulfate on non-aqueous basis, said emulsifier being capable of emulsifying in water an aromatic petroleum hydrocarbon oil boiling between about 300 and about 750° F. and containing in solution a weed-killing toxicant from the group consisting of pentachlorophenol, 2,4-dichlorophenoxyacetic acid and their salt and ester derivatives.

6. An herbicidal concentrate in the form of a stable oil-in-water emulsion, 30 to 40% by weight of which is the continuous aqueous phase, and 70 to 60% by weight of which is the disperse oil phase constituted by a solution in an aromatic petroleum hydrocarbon oil boiling between about 300 and about 750° F. of a weed-killing toxicant selected from the group consisting of pentacholorophenol, 2,4-dichlorophenoxyacetic acid and their salt and ester derivatives, said petroleum hydrocarbon oil solution also containing dispersed therein from 1.5 to 10% by weight, based on the total weight of said oil solution, of an emulsifier which comprises from about 25 to about 40 parts by weight of a $C_4$-aliphatic alcohol and from about 75 to about 60 parts by weight of an anionic surface-active agent selected from the group consisting of sodium $C_9$–$C_{18}$ monoalkyl benzene sulfonates and sodium $C_9$–$C_{18}$ monoalkyl sulfates and containing intimately admixed therewith from about 2 to about 15% by weight of sodium sulfate, based on the combined weight of non-aqueous ingredients of said surface-active agent.

7. An herbicidal concentrate in the form of a stable oil-in-water emulsion, 30 to 40% by weight of which is the continuous aqueous phase, and 70 to 60% by weight of which is the disperse oil phase, constituted by a solution in an aromatic petroleum hydrocarbon oil boiling between about 300 and about 750° F. of a weed-killing toxicant selected from the group consisting of pentachlorophenol, 2,4-dichlorophenoxyacetic acid and their salt and ester derivatives, said petroleum hydrocarbon oil solution also containing dispersed therein from 1.5 to 10% by weight, based on the total weight of said oil solution, of an emulsifier which comprises from about 25 to about 40 parts by weight of a $C_4$-aliphatic alcohol and from about 75 to about 60 parts by weight of a $C_9$–$C_{18}$ monoalkyl benzene sulfonate containing intimately dispersed therewith from about 2 to about 15% by weight of sodium sulfate based on the combined weight of said sulfonate and sulfate on non-aqueous basis.

8. An herbicidal concentrate in the form of a stable oil-in-water emulsion, 30 to 40% by weight of which is the continuous aqueous phase, and 70 to 60% by weight of which is the disperse oil phase, constituted by a solution in an aromatic petroleum hydrocarbon oil boiling between about 300 and about 750° F., of a weed-killing toxicant selected from the group consisting of pentachlorophenol, 2,4-dichlorophenoxyacetic acid and their salt and ester derivatives, said petroleum hydrocarbon oil solution also containing dispersed therein from 1.5 to 10% by weight, based on the total weight of said oil solution, of an emulsifier which comprises from about 25 to about 40 parts by weight of a $C_4$-aliphatic alcohol and from about 75 to about 60 parts by weight of sodium $C_9$–$C_{18}$ monoalkyl sulfate and containing intimately admixed therewith from about 2 to about 15% by weight of sodium sulfate based on the combined weight of said organic sulfate and inorganic sulfate on non-aqueous basis.

9. A method for preparing an herbicidal concentrate containing a weed-killing toxicant selected from the group consisting of pentachlorophenol, 2,4-dichlorophenoxyacetic acid and their salt and ester derivatives, said method comprising dissolving said toxicant in an aromatic petroleum hydrocarbon oil boiling between about 300 and about 750° F. in the presence of an emulsifier comprising in each 100 parts thereof from 25 to 40 parts by weight of a $C_4$-aliphatic alcohol and from 75 to 60 parts by weight of an anionic surface-active agent selected from the group consisting of sodium $C_9$–$C_{18}$ monoalkyl benzene sulfonates and sodium $C_9$–$C_{18}$ monoalkyl sulfates and containing intimately admixed therewith from about 2 to about 15% by weight of sodium sulfate, based on the combined weight of non-aqueous ingredients of said surface-active agent; thereafter dispersing the resulting stable aromatic petroleum hydrocarbon oil dispersion in water to form a stable oil-in-water emulsion, from 30 to 40% by weight of which is the continuous aqueous phase, and the remaining 70 to 60% by weight is the disperse oil phase.

10. A method for preparing an herbicidal concentrate containing a weed-killing toxicant selected from the group consisting of pentachlorophenol, 2,4-dichlorophenoxyacetic acid and their salt and ester derivatives, which method comprises dissolving said toxicant in a petroleum aromatic hydrocarbon oil boiling between about 300 and about 750° F. in the presence of an emulsifier comprising in each 100 parts thereof from 25 to 40 parts by weight of a $C_4$-aliphatic alcohol and from 75 to 60 parts by weight of sodium $C_9$–$C_{18}$ monoalkyl benzene sulfonate, said sulfonate containing intimately admixed therewith from about 2 to about 15% by weight of sodium sulfate based on the combined weight of non-aqueous organic sulfonate and inorganic sulfate, and dispersing the resulting stable petroleum aromatic hydrocarbon oil dispersion in water to form a stable oil-in-water emulsion, from 30 to 40% by weight of which is the continuous aqueous phase, and the remaining 70 to 60% by weight is the disperse oil phase.

11. A water-soluble emulsifier, each 100 parts by weight whereof comprises from about 25 to about 40 parts by weight of a saturated $C_4$-aliphatic alcohol and from about 75 to about 60 parts by weight of an anionic surface-active agent selected from the group consisting of sodium $C_9$–$C_{18}$ monoalkyl benzene sulfonates and sodium $C_9$–$C_{18}$ monoalkyl sulfates and containing intimately admixed therewith from about 2 to about 15% by weight of sodium sulfate, based on the combined weight of non-aqueous ingredients of said surface-active agent.

12. A water-soluble emulsifier, each 100 parts by weight whereof comprises from about 25 to about 40 parts by weight of a saturated $C_4$-aliphatic alcohol and from about 75 to about 60 parts by weight of sodium $C_9$–$C_{18}$ monoalkyl benzene sulfonate containing intimately admixed therewith from about 2 to about 15% by weight of sodium sulfate, based on the combined weight of said sulfonate and sulfate on non-aqueous basis.

13. A water-soluble emulsifier, each 100 parts by weight whereof comprises from about 25 to about 40 parts by weight of a saturated $C_4$-aliphatic alcohol and from about 75 to about 60 parts by weight of sodium $C_9$–$C_{18}$ monoalkyl sulfate containing intimately admixed therewith from about 2 to about 15% by weight of sodium sulfate, based on the combined weight of said organic sulfate and inorganic sulfate on non-aqueous basis.

14. A method of stabilizing against sedimentation sodium sulfate contained in aqueous dispersions of anionic surface-active agents selected from the group consisting of sodium $C_9$–$C_{18}$ monoalkyl benzene sulfonates and sodium $C_9$–$C_{18}$ monoalkyl sulfates, which comprises mixing with said dispersions from about 25 to about 40% by weight of a saturated $C_4$-aliphatic alcohol based on the combined weight of said anionic surface-active agent and said sodium sulfate.

15. A method of stabilizing against sedimentation sodium sulfate contained in aqueous dispersions of sodium $C_9$–$C_{18}$ monoalkyl benzene sulfonate, which comprises mixing with said dispersions from 25 to about 40% by weight of a saturated $C_4$-aliphatic alcohol, based on the combined weight of said sulfonate and said sulfate.

16. A method of stabilizing against sedimentation sodium sulfate contained in aqueous dispersions of sodium $C_9$–$C_{18}$ monoalkyl sulfate, which comprises mixing with said dispersion from 25 to 40% by weight of a saturated $C_4$-aliphatic alcohol, based on the combined weight of said sodium sulfate and said organic sulfate.

References Cited in the file of this patent

UNITED STATES PATENTS

| | | |
|---|---|---|
| 2,298,650 | Samaras et al. | Oct. 13, 1942 |
| 2,391,087 | Donlan et al. | Dec. 18, 1945 |
| 2,510,839 | Shmidl | June 6, 1950 |
| 2,543,397 | Allen | Feb. 27, 1951 |